(12) United States Patent
Thompson et al.

(10) Patent No.: US 8,820,783 B1
(45) Date of Patent: Sep. 2, 2014

(54) GAS GENERATING SYSTEM

(71) Applicant: TK Holdings Inc., Armada, MI (US)

(72) Inventors: Christian P. Thompson, Rochester Hills, MI (US); David M. McCormick, Grosse Pointe Farms, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 13/736,847

(22) Filed: Jan. 8, 2013

Related U.S. Application Data

(60) Provisional application No. 61/584,297, filed on Jan. 8, 2012.

(51) Int. Cl.
*B60R 21/26* (2011.01)
(52) U.S. Cl.
USPC ............................................. 280/741
(58) Field of Classification Search
CPC ............... B60R 21/26; B60R 21/2644; B60R 2021/2633; B60R 2021/2648; B60R 21/276; F42B 3/04; F42B 3/14; F42B 3/10
USPC ................ 280/740, 741, 742; 102/530, 202.8
See application file for complete search history.

(56) References Cited

U.S. PATENT DOCUMENTS

| | | | |
|---|---|---|---|
| 6,315,322 B1 * | 11/2001 | Mika ............................. | 280/736 |
| 8,276,521 B2 * | 10/2012 | Reichelt et al. ............... | 102/530 |
| 2004/0163565 A1 * | 8/2004 | Gabler et al. .................. | 102/530 |
| 2005/0161924 A1 * | 7/2005 | Schoenhuber et al. ....... | 280/741 |
| 2006/0119087 A1 * | 6/2006 | Blessing et al. .............. | 280/736 |
| 2006/0137786 A1 * | 6/2006 | Yamazaki et al. ............. | 149/22 |
| 2009/0115175 A1 * | 5/2009 | Nishimura et al. ........... | 280/741 |
| 2013/0200600 A1 * | 8/2013 | Bierwirth et al. ............. | 280/740 |
| 2013/0239839 A1 * | 9/2013 | Yamazaki et al. ............ | 102/530 |

* cited by examiner

*Primary Examiner* — Faye M. Fleming
(74) *Attorney, Agent, or Firm* — L.C. Begin & Associates, PLLC

(57) ABSTRACT

A gas generating system includes a housing structured to form a booster tube mounting structure therein, and a booster tube engaged with the mounting structure so as to form a gas-tight seal therebetween and so as to be movable with respect to the mounting structure, and such that the seal is maintained during movement of the tube with respect to the mounting structure, while the tube is engaged with the mounting structure.

16 Claims, 7 Drawing Sheets

US 8,820,783 B1

GAS GENERATING SYSTEM

CROSS REFERENCE TO RELATED APPLICATIONS

This application claims the benefit of provisional application Ser. No. 61/584,297, filed on Jan. 8, 2012, the disclosure of which is incorporated herein by reference.

BACKGROUND OF THE INVENTION

The present invention relates generally to systems for generating gasses for gas-actuatable devices.

SUMMARY OF THE INVENTION

In one aspect of the embodiments of the present invention, a gas generating system includes a housing structured to form a booster tube mounting structure therein, and a booster tube engaged with the mounting structure so as to form a gas-tight seal therebetween and so as to be movable with respect to the mounting structure, and such that the seal is maintained during movement of the tube with respect to the mounting structure, while the tube is engaged with the mounting structure.

In another aspect of the embodiments of the present invention, a gas generating system includes a housing structured to permit expansion thereof responsive to elevated pressures within the housing, a booster tube mounting structure formed by a portion of the housing, and a booster tube structured and engaged with the housing so as to form and maintain a gas-tight seal between the tube and the mounting structure during expansion of the housing.

DETAILED DESCRIPTION

Figure 1:
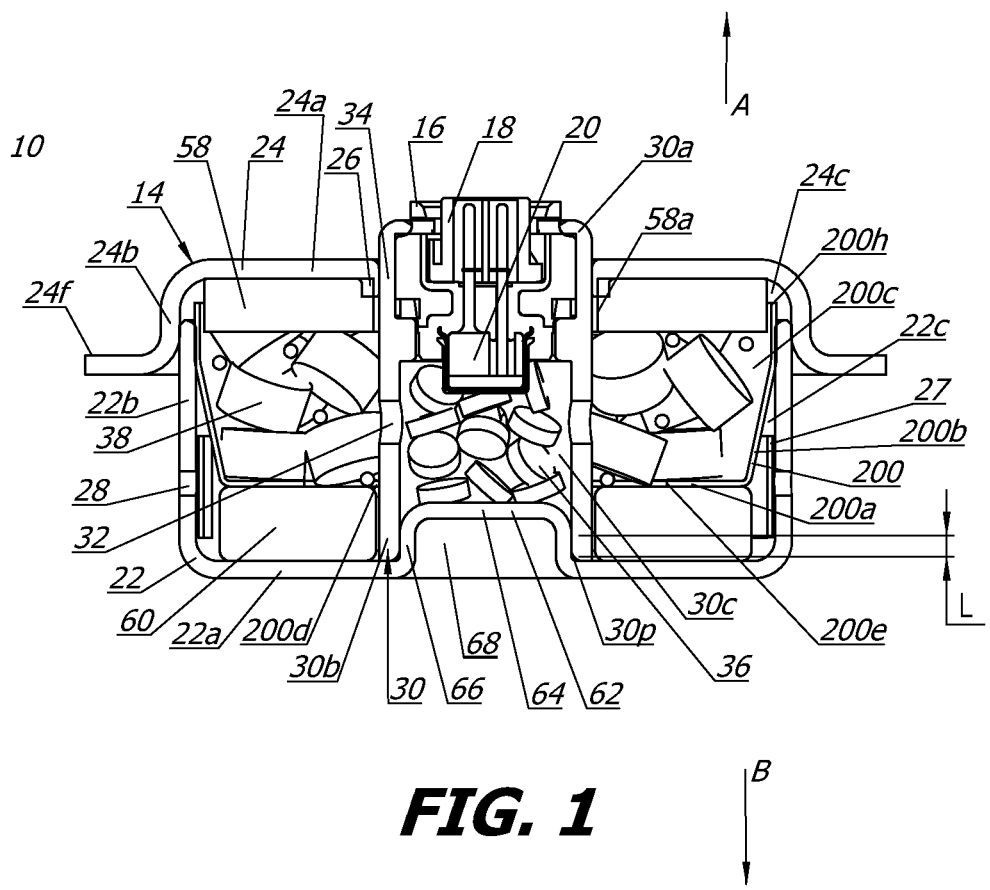
FIG. 1 is a cross-sectional side view of a gas generating system incorporating a booster tube mounting structure in accordance with one embodiment the present invention.

Similar reference characters denote similar features consistently throughout the attached drawings.

FIG. 1 illustrates a gas generating system 10 incorporating a booster tube mounting structure in accordance with one embodiment of the present invention. Gas generating system 10 may be utilized to generate gases usable to, for example, inflate a vehicle airbag.

In the embodiments described herein, the gas generating system includes an outer housing 14 containing components of the system positioned therein or attached thereto. A portion of the outer housing is structured to form a booster tube mounting structure 62 to which a booster tube 30 is attached. The mounting structure is configured so as to be in direct contact with an auto-ignition material or auto-igniting booster material positioned within the booster tube when the booster tube is mounted on the mounting structure.

As seen in FIG. 1, gas generating system 10 includes a gas generating system outer housing 14 formed by bonding, welding, or otherwise securing together a first housing portion 22 and a second housing portion 24 in a nested relationship, so as to form a gas-tight seal therebetween. First housing portion 22 and second housing portion 24 are also joined so as to prevent separation of the housing portions and maintain the gas-tight seal during operation of the gas generating system. The first and second housing portions may be fabricated (for example, by stamping, casting, forming, or some other suitable process) from one or more rigid materials such as carbon steel, stainless steel or any other suitable material or materials.

First housing portion 22 has a base portion 22a and a wall 22b extending from an edge of the base portion to define a cavity 22c configured for receiving therein various additional elements of the gas generating system. A plurality of gas discharge apertures 28 are spaced circumferentially along wall 22b to enable fluid communication between cavity 22c and an exterior of the first housing portion. A booster tube mounting structure, generally designated 62, is formed in base portion 22a. In the embodiment shown in FIG. 1, mounting structure 62 has a base portion 64 and a wall 66 extending from an edge of the base portion 64 to connect with the remainder of first housing portion base portion 22a, thereby forming a cavity 68 therebetween.

Mounting structure 62 is also structured to engage an end 30b of booster tube 30 so as to form a gas-tight seal therebetween, to prevent or minimize leakage of gases from the interior of the booster tube through the contact interface between the booster tube and the mounting structure while the booster tube is engaged with the mounting structure. Mounting structure 62 is also structured to engage an end 30b of booster tube 30 so as to be movable with respect to the mounting structure In the particular embodiment shown in FIG. 1, an opening 30p is formed in booster tube end 30b, mounting structure 62 extends into opening 30p, and an outer surface of the mounting structure 62 is configured with respect to the size and shape of the booster tube opening 30p so as to form an interference fit with the booster tube 30 when the mounting structure 62 is inserted into the opening 30p. Thus engaged with the booster tube end portion 30b, the mounting structure 62 aids in locating and positionally stabilizing the engaged end of the booster tube within the housing. In the particular embodiment shown in FIG. 1, mounting structure 62 is generally cylindrical. However, the mounting structure may have any suitable shape according to the requirements of a particular application.

In the embodiment shown in FIG. 1, second housing portion 24 includes a base portion 24a and a wall 24b extending from an edge of the base portion to define a cavity 24c configured for receiving therein a portion of wall 22b of first housing portions and also portions of any additional elements of the gas generating system, as required. A flange 24f may extend from a periphery of the wall 24b to aid in mounting of the housing 14 to another structure, for example, a portion of a vehicle. In the embodiment shown in FIG. 1, an aperture 26 is provided in base portion 24a for receiving a portion of booster tube 30 therein. Tube 30 is secured to second housing portion 24 within aperture 26 so as to form a gas-tight seal between the tube and the second housing portion. Tube 30 is secured to second housing portion 24 within aperture 26 such that the gas-tight seal between the tube and the second housing portion is maintained during any deformation or expansion of the second housing portion 24 which may occur during operation of the gas generating system.

An igniter assembly 16 is provided for igniting a booster composition 36 (described in greater detail below) in response to an activation signal from a vehicle collision sensing system (not shown in FIG. 1). In the embodiment shown in FIG. 1, igniter assembly 16 includes an igniter holder 18 having a cavity formed for receiving an igniter 20 therein. Igniter 20 may be secured within the holder cavity using any of a number of known methods, for example, crimping, adhesive application, insert molding, or fasteners. A rear portion of assembly 16 may be configured to provide an interface mateable with a complementary connector of a wiring harness or other suitable initiator activation signal transmission medium. Holder 18 may be formed from a metal, metal alloy or any other suitable material using any suitable manufacturing process. Igniter 20 may be formed as known in the art. One exemplary igniter construction is described in U.S. Pat. No. 6,009,809, herein incorporated by reference. Igniter assembly 16 is secured to an end 30a of booster tube 30 so as to form a gas-tight seal between the igniter assembly and the booster tube. The igniter assembly may be secured to the booster tube using any of a variety of known methods, such as crimping (as shown in FIG. 1), welding or the formation of a gas-tight interference fit between the igniter assembly and the booster tube.

Booster tube 30 has a first end 30a, a second end 30b opposite the first end, and a wall 34 extending between the ends. In the embodiment shown in FIG. 1, end 30a is structured to abut a portion of igniter holder 18 so as to form a substantially gas-tight seal at the holder-booster tube contact interface. Tube 30 is welded or otherwise secured to second housing portion 24 along an edge of aperture 26 so as to form a gas-tight seal between the tube 30 and the second housing portion 24, and so as to maintain this securement and seal during operation of the gas generating system.

Tube 30 defines a cavity 30c between ends 30a and 30b structured for receiving therein a booster material 36 and (optionally) an auto-ignition material (not shown). A plurality of gas discharge apertures 32 is spaced circumferentially along wall 34 to enable fluid communication between an interior of the booster tube and an exterior of the tube. As previously described, tube end 30b is configured to engage mounting structure 62 so as to prevent or minimize leakage of gases from the interior of the booster tube through the contact interface between the booster tube and the mounting structure, while the booster tube is engaged with the mounting structure.

In general, tube end 30b is structured so as to be engageable with mounting structure 62 (for example, in an inteference fit), so as to form a gas-tight seal therebetween while the booster tube is mounted on the mounting structure. In the embodiment shown in FIG. 1, tube end 30b is open so as to engage the mounting structure 62 as previously described. However, the tube end 30b and the mounting structure 62 may have any suitable complementarily engageable configurations according to the requirements of a particular application. Tube end 30b is also engaged with mounting structure 62 so as to permit relative motion between the tube end and the mounting structure, and such that the gas-tight seal between the tube and the second housing portion is maintained during motion of the booster tube along the mounting structure and during any deformation or expansion of the housing portions 22 and 24 which may occur during operation of the gas generating system, while the tube remains in contact with the mounting structure. In an embodiment in which an interference fit is formed between the mounting structure and the booster tube, the tube and the mounting structure may be dimensioned so as to prevent separation between the mounting structure and the tube during expansion of the housing.

In the embodiment shown in FIG. 1, tube 30 has a generally cylindrical shape. However, tube 30 may have any shape suitable to the requirements of a particular application. Booster tube 30 is fabricated (for example, by stamping, casting, forming, extrusion, or some other, suitable process) from a rigid material such as carbon steel, stainless steel or any other suitable material.

Booster tube gas discharge apertures 32 may be covered with rupturable, gas-tight seals or shims (not shown) to seal the apertures. Various known disks, foils, films, or tapes (for example, aluminum or stainless steel shims, foil or tape) may be used to form the seals. The seal material is typically adhered to an interior surface of the booster tube through the use of an adhesive. Alternatively, other materials or methods may be used to seal apertures 32.

Booster material 36 is positioned within booster tube 30 and a primary gas generating material 38 (also described below) is positioned externally of the booster tube. Booster material 36 is ignitable via igniter 20 (and an associated auto-ignition material, if needed) in a conventional manner to ignite and enhance the burn characteristics of gas generant material 38. In one particular embodiment, booster material 36 is a known auto-igniting booster material positioned in tube 30 so as to enable thermal communication with the mounting structure 62 after activation of the gas generating system, thereby enabling heat transfer from an exterior of the housing to the auto-igniting booster material using the housing (and, in particular, mounting structure 62) as a heat transfer medium. In a manner known in the art, the auto-igniting booster material fulfills the functions of both a conventional booster material and a conventional auto-ignition material, enabling ignition of the gas generant material in cases where the housing 14 is exposed to an elevated external temperature resulting from, for example, a flame. This obviates the need for a separate auto-ignition material.

In an embodiment not utilizing an auto-igniting booster material, a quantity of a separate, known auto-ignition material (not shown) may be positioned within the gas generating system 10 such that combustion of the auto-ignition material will produce ignition of the booster material, in a manner known in the art. In the embodiment shown in FIG. 1, auto-ignition material is positioned along with booster material 36 within booster tube 30 so that the auto-ignition material is in direct contact with the booster material.

In addition, at least a portion of any conventional auto-ignition material or auto-igniting booster material is positioned within the system so as to provide direct contact with housing 14, such that heat transmitted to the housing exterior due to an elevated temperature event (for example, a flame impinging upon the housing) will be transmitted via the housing to the auto-ignition material or auto-igniting booster material. This positioning of the auto-ignition and auto-igniting booster materials helps to ensure prompt ignition of the gas generant material upon occurrence of the elevated temperature event, in a manner known in the art. In the embodiment shown in FIG. 1, at least a portion the auto-ignition material (or auto-igniting booster material) is positioned within booster 30 and in contact with mounting structure 62 of housing 14.

Gas generant material 38 may be any suitable gas generant composition known in the art. Exemplary gas generant compositions include, but are not limited to, those described in U.S. Pat. Nos. 5,035,757, 5,872,329, 5,756,929, and 5,386,775. In the embodiment shown, gas generant 38 is provided in tablet form, but may be provided in other forms.

A filter 60 is positioned within housing 14 for filtering particulates from gases generated by combustion of gas generant 38. In general, filter 60 is positioned between gas generant 38 and gas-exit apertures 28 formed along first housing portion 22 so that gasses generated by combustion of the gas generant will flow through the filter prior to exiting the housing 14. In the embodiment shown in FIG. 1, filter 60 is an annular filter positioned within housing first portion cavity 22c. However, the filter may have any suitable shape.

The filter 60 may be formed from any of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J. However, the filter may have any suitable composition.

Referring again to FIG. 1, a receptacle 200 is positioned within first housing portion cavity 22a for receiving gas generant material 38 therein. In the embodiment shown in FIG. 1, receptacle 200 has a base portion 200a and a wall 200b extending from a periphery of the base portion to define a cavity 200c for receiving the gas generant material. Base portion 200a has an opening 200d formed therein to permit tube 30 to extend therethrough. An end of wall 200b defines an opening 200h which may be dimensioned to receive a portion of a cushion 58 therein. In addition, base portion 200b has a plurality of openings 200e formed therealong to enable fluid communication through the base portion between cavity 200c and an exterior of the receptacle. Openings 200e permit gases generated by combustion of gas generant 38 to flow out of cavity 200c and into filter 60 prior to exiting housing 14.

Referring again to FIG. 1, a cushion or pad 58 is positioned within cavity 24c overlying gas generant material 38. Pad 58 aids in holding the gas generant material 38 in place and/or in cushioning the gas generant against vibration and impact. In the embodiment shown in FIG. 1, pad 58 has an opening 58a through which booster tube 30 extends. Pad 58 may be formed from, for example, a ceramic fiber material or any other suitable material. Receptacle opening 200d and cushion 58 may be configured such that in interference fit is formed between the receptacle 200 and the cushion when the cushion is received in opening 200h. Cushion 58, receptacle 200, and the portion of booster tube 30 extending through the receptacle 200 combine to define a combustion chamber for the gas generant material 38.

First housing portion gas discharge apertures 28 may be covered with rupturable, gas-tight seals or shims 27 to seal the apertures. Various known disks, foils, films, or tapes (for example, aluminum or stainless steel shims, foil or tape) may be used to form the seals. The seal material is typically adhered to an interior surface of the first housing portion through the use of an adhesive. Alternatively, other materials or methods may be used to seal apertures 28.

During operation of the gas generating system 10, igniter 20 activates in a manner known in the art upon receiving a signal from a vehicle crash sensing system or other activation signal source. Activation of igniter 20 results in combustion of booster material 36. Flame and hot gases from combustion of the booster material then exit booster tube apertures 32 to ignite gas generant material 38. Gases from the combustion of gas generant 38 flow through gas flow openings 200e formed in receptacle 200 and into filter 60. The gases then flow through filter 60 and out of the filter into first housing cavity 22c adjacent gas exit openings 28. Elevated pressures cause shims 27 to burst, releasing the generated gases through gas exit openings 28 and into a gas-actuatable element (not shown) operatively coupled to the gas generating system. As the combustion gases pass through receptacle 200 and filter 60 to exit apertures 28, the gases are cooled and flames are suppressed. Thus, the gas flow path extending between receptacle chamber 200c and housing gas exit apertures 28 provides a structure or system for expansion and cooling of the generated gases thereby suppressing the generated flame front, prior to their release into, for example, an inflatable element of a vehicle occupant protection system.

In a particular embodiment, first and second housing portions 22 and 24 may be configured to permit expansion or outward bulging of the housing portions in the directions indicated by arrows "A" (for second housing portion 24) and "B" (for first housing portion 22) responsive to elevated pressures within housing 14 during operation of the gas generating system. In the event of such expansion, because tube 30 is attached to second housing portion 24 so as to maintain the gas-tight seal therebetween during operation of the gas generating system, and because booster tube end 30b is attached to mounting structure 62 using an interference fit, expansion of second housing portion 24 in direction "A" will cause booster tube end 30b to slide along mounting structure 62 as expansion of the housing 14 pulls tube 30 in direction "A" and mounting structure 62 in direction "B".

The structures of mounting structure 62 and booster tube 30 and/or the length L of engagement between the tube and the mounting structure may be specified so as to ensure that the engagement and gas-tight seal between the booster tube 30 and the mounting structure 62 are maintained during housing expansion, given a projected amount of expansion of first and second housing portions 22 and 24 for a particular application. This helps ensure that all of the by-products resulting from combustion of the booster material are directed through booster tube openings 32 to gas generant material 38, for producing and facilitating combustion of the gas generant material. Alternatively, the structures of mounting structure 62 and booster tube 30 and/or the length L of engagement between the tube and the mounting structure may be specified so as to permit a degree of spacing or separation d between the booster tube end 30b and the mounting structure 62 due to expansion of the first and second housing portions.

Figure 2:
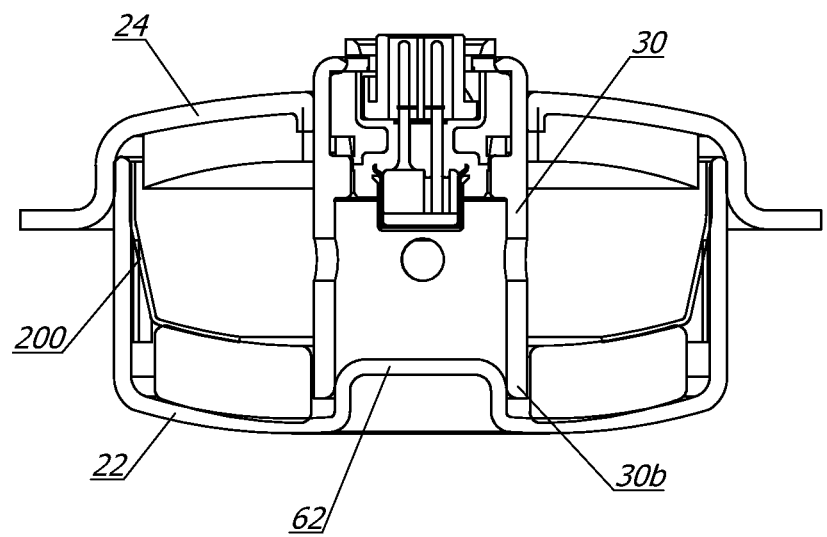
FIG. 2 is a cross-sectional view of a gas generating system having the same basic components shown in FIG. 1 after deployment, with the system housing expanded or distended, and where there is no separation between the booster tube and the housing mounting structure caused by housing expansion during deployment.

FIG. 2 shows a cross-sectional post-deployment view of an embodiment of the gas generating system having the same structural components shown in FIG. 1. Some of the reference numerals shown in FIG. 1 have been omitted from FIG. 2. FIG. 2 shows a state of the system after deployment is complete, with the system housing expanded or distended, and where there is no separation between the booster tube and the housing mounting structure. Distension or deformation of the portion of second housing portion 24 to which booster tube 30 is attached has pulled the tube and its end 30b along the mounting structure 62. In this embodiment, the mounting structure 62 and the booster tube 30 are dimensioned so that the contact and the seal formed between the booster tube and the mounting structure are maintained during deployment of the gas generating system and the resultant expansion or distension of the housing 14.

Figure 3:
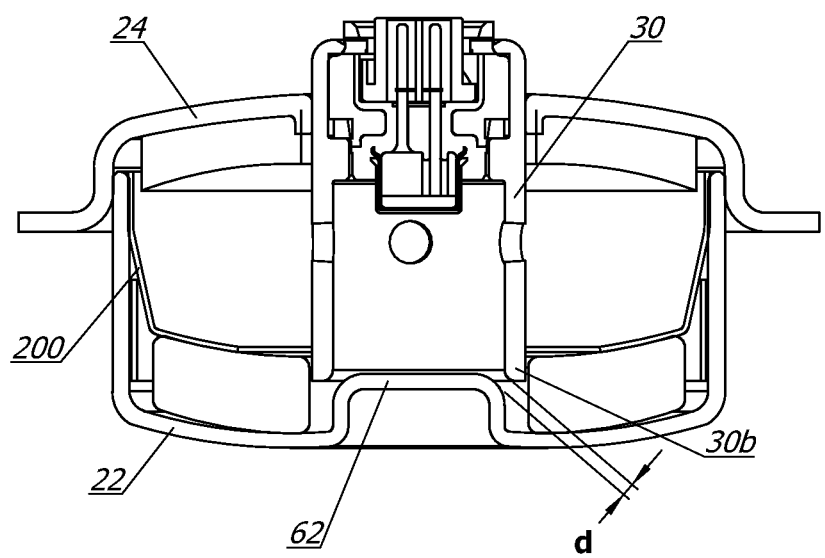
FIG. 3 is a is a cross-sectional view of a gas generating system having the same basic components shown in FIG. 1 after deployment, with the system housing expanded or distended, and where there has been a degree of separation d between the booster tube and the housing mounting structure caused by housing expansion during deployment.

FIG. 3 shows a cross-sectional post-deployment view of an embodiment of the gas generating system having the same structural components shown in FIG. 1. Some of the reference numerals shown in FIG. 1 have been omitted from FIG. 3. FIG. 3 shows a state of the system after deployment is complete, with the system housing expanded or distended, and where there is a degree of separation or spacing d between the booster tube and the housing mounting structure. In this embodiment, some separation d between the booster tube and the mounting structure occurs as a result of housing expansion. That is, distension or deformation of the portion of second housing portion 24 to which booster tube 30 is attached has pulled the tube and its end 30b along the mounting structure 62. In particular embodiments, where it is permissible that a gap d be formed between the booster tube end 30b and the mounting structure 62 as a result of housing expansion, the mounting structure and booster tube are structured such that the gas-tight seal between these components is maintained at least until the gas generant 38 has been ignited by products of combustion of booster material 36. The particular component dimensions and/or attachment forces between the components required to maintain the seal until ignition of the gas generant may be calculated or experimentally given the particulars of a given application, according to such factors as the amount and type of gas generant used, the available size envelope of the gas generating system, the contemplated or desired methods of attaching the booster tube to the mounting structure, and other pertinent factors.

Figure 4:
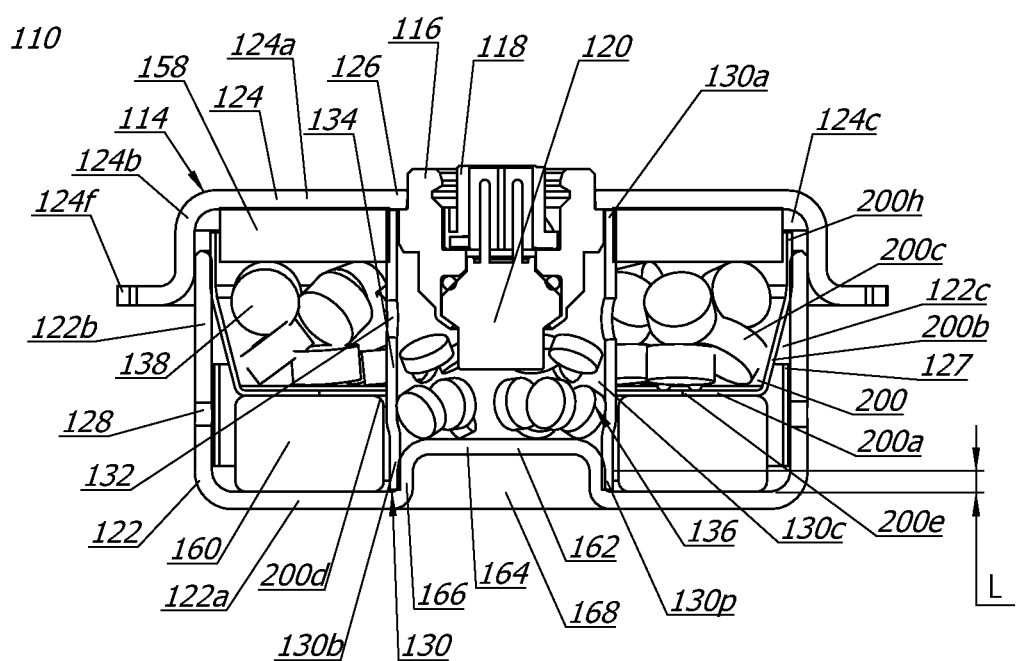
FIG. 4 is a cross-sectional side view of a gas generating system incorporating a booster tube mounting structure in accordance with another embodiment the present invention.

FIG. 4 illustrates a gas generating system 110 incorporating a booster tube mounting structure in accordance with another embodiment of the present invention. Gas generating system 110 includes an outer housing 114 containing components of the system positioned therein or attached thereto. A portion of the outer housing is structured to form a booster tube mounting structure 162 to which a booster tube 130 is attached. The mounting structure is configured so as to be in direct contact with an auto-ignition material or auto-igniting booster material positioned within the booster tube when the booster tube is mounted on the mounting structure.

As seen in FIG. 4, gas generating system 110 includes a gas generating system outer housing 114 formed by bonding, welding, or otherwise securing together a first housing portion 122 and a second housing portion 124 in a nested relationship, so as to form a gas-tight seal therebetween. First housing portion 122 and second housing portion 124 are also joined so as to prevent separation of the housing portions and maintain the gas-tight seal during operation of the gas generating system. The first and second housing portions may be fabricated (for example, by stamping, casting, forming, or some other suitable process) from one or more rigid materials such as carbon steel, stainless steel or any other suitable material or materials.

First housing portion 122 has a base portion 122a and a wall 122b extending from an edge of the base portion to define a cavity 122c configured for receiving therein various additional elements of the gas generating system. A plurality of gas discharge apertures 128 are spaced circumferentially along wall 122b to enable fluid communication between cavity 122c and an exterior of the first housing portion. A booster tube mounting structure, generally designated 162, is formed in base portion 122a. In the embodiment shown in FIG. 4, mounting structure 162 has a base portion 164 and a wall 166 extending from an edge of the base portion 164 to connect with the remainder of first housing portion base portion 122a, thereby forming a cavity 168 therebetween.

Mounting structure 162 is also structured to engage an end 130b of booster tube 130 so as to form a gas-tight seal therebetween, to prevent leakage of gases from the interior of the booster tube through the contact interface between the booster tube and the mounting structure while the booster tube is engaged with the mounting structure. Booster tube second end 130b may be secured to mounting structure 162 by welding, crimping, or any other attachment method suitable for providing a gas-tight seal between the booster tube end and the mounting structure, and for maintaining the seal and contact between the tube and mounting structure during deployment of the gas generating system and the resultant expansion of the housing, as described below. In the particular embodiment shown in FIG. 4, an opening 130p is formed in booster tube end 130b and mounting structure 162 extends into opening 130p to enable attachment of the booster tube end 130b to the mounting structure. Thus engaged with the booster tube end portion 130b, the mounting structure 162 also aids in locating and positionally stabilizing the engaged end of the booster tube within the housing. In the particular embodiment shown in FIG. 4, mounting structure 62 is generally cylindrical. However, the mounting structure may have any suitable shape according to the requirements of a particular application.

In the embodiment shown in FIG. 4, second housing portion 124 includes a base portion 124a and a wall 124b extending from an edge of the base portion to define a cavity 124c configured for receiving therein a portion of wall 122b of first housing portions and also portions of any additional elements of the gas generating system, as required. A flange 124f may extend from a periphery of the wall 124b to aid in mounting of the housing 114 to another structure, for example, a portion of a vehicle. In the embodiment shown in FIG. 4, an aperture 126 is provided in base portion 124a for receiving a portion of an igniter assembly 116 therein.

Booster tube first end 130a is secured to igniter assembly 116 (using an interference fit or other suitable method) so as to form a gas-tight seal between the tube and the igniter assembly. Booster tube end 130a is also structured to engage a portion of igniter assembly 116 so as to be movable with respect to the igniter assembly, and such that the gas-tight seal formed between the booster tube and the igniter assembly is maintained during expansion of the housing 114 and movement of the booster tube end 130a with respect to the igniter assembly. In the embodiment shown in FIG. 4, booster tube end 130a is structured to engage an igniter assembly holder 118 (described below) to form a gas-tight seal therewith. However, the booster tube end 130a may be structured to engage (and be movable with respect to) any other portion of the igniter assembly, based in the particular configuration of the assembly. Alternatively, the booster tube end 130a may be structured to engage (and be movable with respect to) a portion of housing portion 124 or any other element of the gas generating system engageable to provide a gas tight seal between the booster tube end and the element, and so as to enable movement of booster tube end 130a with respect to the element Igniter assembly 116 is provided for igniting a booster composition 136 (described in greater detail below) in response to an activation signal from a vehicle collision sensing system (not shown in FIG. 4). In the embodiment shown in FIG. 4, igniter assembly 116 includes an igniter holder 118 having a cavity formed for receiving an igniter 120 therein. Igniter 120 may be secured within the holder cavity using any of a number of known methods, for example, crimping, adhesive application, insert molding, or fasteners. A rear portion of assembly 116 may be configured to provide an interface mateable with a complementary connector of a wiring harness or other suitable initiator activation signal transmission medium. Holder 118 may be formed from a metal, metal alloy or any other suitable material using any suitable manufacturing process. Igniter 120 may be formed as known in the art. One exemplary igniter construction is described in U.S. Pat. No. 6,009,809, herein incorporated by reference. Igniter assembly 116 is secured to an end 30a of booster tube 30 so as to form a gas-tight seal between the igniter assembly and the booster tube. The igniter assembly may be secured to the booster tube using any of a variety of known methods, such as crimping (as shown in FIG. 4), welding or the formation of a gas-tight interference fit between the igniter assembly and the booster tube.

Booster tube 130 has a first end 130a, a second end 130b opposite the first end, and a wall 134 extending between the ends. In the embodiment shown in FIG. 4, end 130a is structured to abut a portion of igniter assembly 116 as previously described, so as to form a substantially gas-tight seal at the holder-booster tube contact interface.

Tube 130 defines a cavity 130c between ends 130a and 130b structured for receiving therein a booster material 136 and (optionally) an auto-ignition material (not shown). A plurality of gas discharge apertures 132 is spaced circumferentially along wall 134 to enable fluid communication between an interior of the booster tube and an exterior of the tube. As previously described, tube end 130b is attached to mounting structure 162 so as to prevent leakage of gases from the interior of the booster tube through the contact interface between the booster tube and the mounting structure during deployment of the gas generating system.

In general, tube end 130b is secured to mounting structure 162 (for example, in an inteference fit), so as to form a gas-tight seal therebetween. In the embodiment shown in FIG. 4, tube end 130b is open so as to engage the mounting structure 162 as previously described. However, the tube end 130b and the mounting structure 162 may have any suitable complementarily engageable configurations according to the requirements of a particular application.

As stated previously, in the embodiment shown in FIG. 4, tube end 130a is engaged with igniter assembly 118 so as to permit relative motion between the tube end and the igniter assembly, and such that the gas-tight seal between the tube and the igniter assembly is maintained during motion of the booster tube with respect to the igniter assembly and during any deformation or expansion of the housing portions 122 and 124 which may occur during operation of the gas generating system, while the tube remains in contact with the igniter assembly. In an embodiment in which an interference fit is formed between the igniter assembly and the booster tube, the tube and the igniter assembly may be dimensioned so as to prevent separation between the igniter assembly and the tube during expansion of the housing.

In the embodiment shown in FIG. 4, tube 130 has a generally cylindrical shape. However, tube 130 may have any shape suitable to the requirements of a particular application. Booster tube 130 is fabricated (for example, by stamping, casting, forming, extrusion, or some other, suitable process) from a rigid material such as carbon steel, stainless steel or any other suitable material.

Booster tube gas discharge apertures 132 may be covered with rupturable, gas-tight seals or shims (not shown) to seal the apertures. Various known disks, foils, films, or tapes (for example, aluminum or stainless steel shims, foil or tape) may be used to form the seals. The seal material is typically adhered to an interior surface of the booster tube through the use of an adhesive. Alternatively, other materials or methods may be used to seal apertures 132.

Booster material 136 is positioned within booster tube 130 and a primary gas generating material 138 (also described below) is positioned externally of the booster tube. Booster material 136 is ignitable via igniter 120 (and an associated auto-ignition material, if needed) in a conventional manner to ignite and enhance the burn characteristics of gas generant material 138. In one particular embodiment, booster material 136 is a known auto-igniting booster material positioned in tube 130 so as to enable thermal communication with the mounting structure 162 after activation of the gas generating system, thereby enabling heat transfer from an exterior of the housing to the auto-igniting booster material using the housing (and, in particular, mounting structure 162) as a heat transfer medium. In a manner known in the art, the auto-igniting booster material fulfills the functions of both a conventional booster material and a conventional auto-ignition material, enabling ignition of the gas generant material in cases where the housing 114 is exposed to an elevated external temperature resulting from, for example, a flame. This obviates the need for a separate auto-ignition material.

In an embodiment not utilizing an auto-igniting booster material, a quantity of a separate, known auto-ignition material (not shown) may be positioned within the gas generating system 110 such that combustion of the auto-ignition material will produce ignition of the booster material, in a manner known in the art. In the embodiment shown in FIG. 4, auto-ignition material is positioned along with booster material 136 within booster tube 130 so that the auto-ignition material is in direct contact with the booster material.

In addition, at least a portion of any conventional auto-ignition material or auto-igniting booster material is positioned within the system so as to provide direct contact with housing 114, such that heat transmitted to the housing exterior due to an elevated temperature event (for example, a flame impinging upon the housing) will be transmitted via the housing to the auto-ignition material or auto-igniting booster material. This positioning of the auto-ignition and auto-igniting booster materials helps to ensure prompt ignition of the gas generant material upon occurrence of the elevated temperature event, in a manner known in the art. In the embodiment shown in FIG. 4, at least a portion the auto-ignition material (or auto-igniting booster material) is positioned within booster 130 and in contact with mounting structure 162 of housing 114.

Gas generant material 138 may be any suitable gas generant composition known in the art. Exemplary gas generant compositions include, but are not limited to, those described in U.S. Pat. Nos. 5,035,757, 5,872,329, 5,756,929, and 5,386,775. In the embodiment shown, gas generant 138 is provided in tablet form, but may be provided in other forms.

A filter 160 is positioned within housing 114 for filtering particulates from gases generated by combustion of gas generant 138. In general, filter 160 is positioned between gas generant 138 and gas-exit apertures 128 formed along first housing portion 122 so that gasses generated by combustion of the gas generant will flow through the filter prior to exiting the housing 114. In the embodiment shown in FIG. 4, filter 160 is an annular filter positioned within housing first portion cavity 122c. However, the filter may have any suitable shape.

The filter 160 may be formed from any of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J. However, the filter may have any suitable composition.

Referring again to FIG. 4, a receptacle 200 is positioned within first housing portion cavity 122a for receiving gas generant material 138 therein. In the embodiment shown in FIG. 4, receptacle 200 has a base portion 200a and a wall 200b extending from a periphery of the base portion to define a cavity 200c for receiving the gas generant material. Base portion 200a has an opening 200d formed therein to permit tube 130 to extend therethrough. An end of wall 200b defines an opening 200h which may be dimensioned to receive a portion of a cushion 158 therein. In addition, base portion 200b has a plurality of openings 200e formed therealong to enable fluid communication through the base portion between cavity 200c and an exterior of the receptacle. Openings 200e permit gases generated by combustion of gas generant 138 to flow out of cavity 200c and into filter 160 prior to exiting housing 114.

Referring again to FIG. 4, a cushion or pad 158 is positioned within cavity 124c overlying gas generant material 138. Pad 158 aids in holding the gas generant material 138 in place and/or in cushioning the gas generant against vibration and impact. In the embodiment shown in FIG. 4, pad 158 has an opening 158a through which booster tube 130 extends. Pad 158 may be formed from, for example, a ceramic fiber material or any other suitable material. Receptacle opening 200d and cushion 158 may be configured such that in interference fit is formed between the receptacle 200 and the cushion when the cushion is received in opening 200h. Cushion 158, receptacle 200, and the portion of booster tube 130 extending through the receptacle 200 combine to define a combustion chamber for the gas generant material 138.

First housing portion gas discharge apertures 128 may be covered with rupturable, gas-tight seals or shims 127 to seal the apertures. Various known disks, foils, films, or tapes (for example, aluminum or stainless steel shims, foil or tape) may be used to form the seals. The seal material is typically adhered to an interior surface of the first housing portion through the use of an adhesive. Alternatively, other materials or methods may be used to seal apertures 128.

During operation of the gas generating system 110, igniter 120 activates in a manner known in the art upon receiving a signal from a vehicle crash sensing system or other activation signal source. Activation of igniter 120 results in combustion of booster material 136. Flame and hot gases from combustion of the booster material then exit booster tube apertures 132 to ignite gas generant material 138. Gases from the combustion of gas generant 138 flow through gas flow openings 200e formed in receptacle 200 and into filter 160. The gases then flow through filter 160 and out of the filter into first housing cavity 122c adjacent gas exit openings 128. Elevated pressures cause shims 127 to burst, releasing the generated gases through gas exit openings 128 and into a gas-actuatable element (not shown) operatively coupled to the gas generating system. As the combustion gases pass through receptacle 200 and filter 60 to exit apertures 128, the gases are cooled and flames are suppressed. Thus, the gas flow path extending between receptacle chamber 200c and housing gas exit apertures 128 provides a structure or system for expansion and cooling of the generated gases thereby suppressing the generated flame front, prior to their release into, for example, an inflatable element of a vehicle occupant protection system.

In a particular embodiment, first and second housing portions 122 and 124 may be configured to permit expansion or outward bulging of the housing portions in the directions indicated by arrows "A" (for second housing portion 124) and "B" (for first housing portion 122) responsive to elevated pressures within housing 114 during operation of the gas generating system. As previously described, tube end 130a is attached to igniter assembly 116 so as to permit motion of the booster tube end with respect to the igniter assembly and so as to maintain the gas-tight seal therebetween during operation of the gas generating system. In addition, booster tube end 130b is attached to mounting structure 162 so as to maintain the gas-tight seal therebetween during expansion of the housing, and so as to move in conjunction with the mounting structure during any such expansion. Thus, expansion of first housing portion 122 in direction "B" will cause booster tube end 130a to slide along igniter assembly 116 as expansion of the housing 114 pulls tube 130 in direction "B" and igniter assembly 116 in direction "A".

The structures of igniter assembly 116 and booster tube 130 and/or the length L' of engagement between the tube and the igniter assembly may be specified so as to ensure that the engagement and gas-tight seal between the booster tube 130 and the igniter assembly 116 are maintained during housing expansion, given a projected amount of expansion of first and second housing portions 122 and 124 for a particular application. This helps ensure that all of the by-products resulting from combustion of the booster material are directed through booster tube openings 132 to gas generant material 138, for producing and facilitating combustion of the gas generant material. Alternatively, the structures of igniter assembly 116 and booster tube 130 and/or the length L' of engagement between the tube and the igniter assembly may be specified so as permit a degree of spacing or separation between the booster tube end 130a and the igniter assembly 116 due to expansion of the first and second housing portions.

Figure 5:
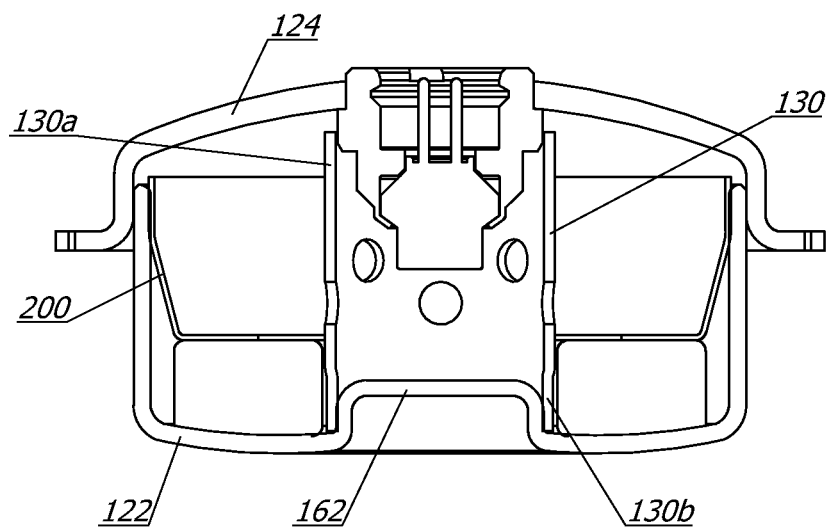
FIG. 5 is a cross-sectional view of a gas generating system having the same basic components shown in FIG. 4 after deployment, with the system housing expanded or distended, and where there is no separation between the booster tube and the housing mounting structure caused by housing expansion during deployment.

FIG. 5 shows a cross-sectional post-deployment view of an embodiment of the gas generating system having the same structural components shown in FIG. 4. Some of the reference numerals shown in FIG. 4 have been omitted form FIG. 5. FIG. 5 shows a state of the system after deployment is complete, with the system housing expanded or distended, and where there is no separation between the booster tube and the igniter assembly 116. Distension or deformation of the portion of first housing portion 122 to which booster tube 130 is attached has pulled the tube and its end 130a along the igniter assembly 116. In this embodiment, the igniter assembly 116 and the booster tube 130 are dimensioned so that the contact and the seal formed between the booster tube and the igniter assembly are maintained during deployment of the gas generating system and the resultant expansion or distension of the housing 114.

Figure 6:
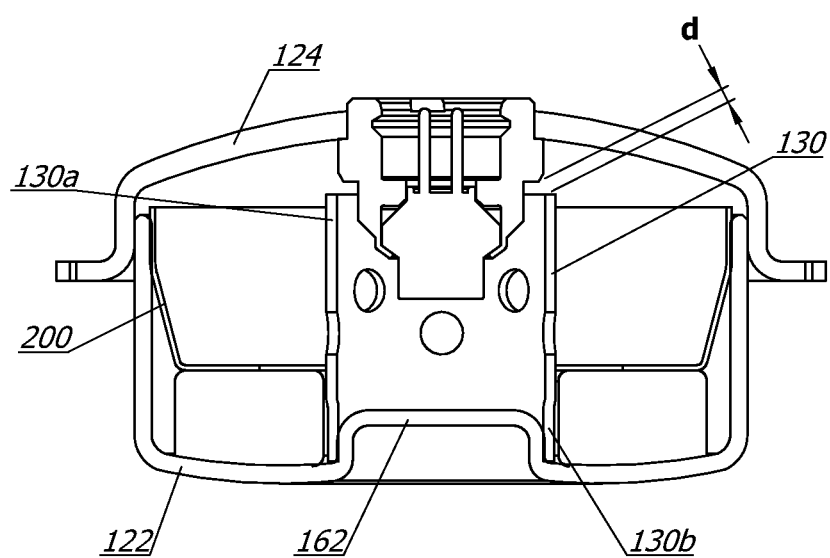
FIG. 6 is a is a cross-sectional view of a gas generating system having the same basic components shown in FIG. 4 after deployment, with the system housing expanded or distended, and where there has been a degree of separation d' between the booster tube and the housing mounting structure caused by housing expansion during deployment.

FIG. 6 shows a cross-sectional post-deployment view of another embodiment of the gas generating system having the same structural components shown in FIG. 4. Some of the reference numerals shown in FIG. 4 have been omitted form FIG. 6. FIG. 6 shows a state of the system after deployment is complete, with the system housing expanded or distended, and where there is a degree of separation d' between the booster tube and the igniter assembly structure. In this embodiment, separation d' between the booster tube and the igniter assembly occurs as a result of housing expansion. That is, distension or deformation of the portion of first housing portion 122 to which booster tube 130 is attached has pulled the tube and its end 130a along the igniter assembly 116. In particular embodiments, where it is permissible that a gap d' be formed between the booster tube end 130a and the igniter assembly 116 as a result of housing expansion, the igniter assembly and booster tube are structured such that the gas-tight seal between these components is maintained at least until the gas generant 138 has been ignited by products of combustion of booster material 136. The particular component dimensions and/or attachment forces between the components required to maintain the seal until ignition of the gas generant may be calculated or experimentally given the particulars of a given application, according to such factors as the amount and type of gas generant used, the available size envelope of the gas generating system, the contemplated or desired methods of attaching the booster tube to the igniter assembly, and other pertinent factors.

Figure 7:
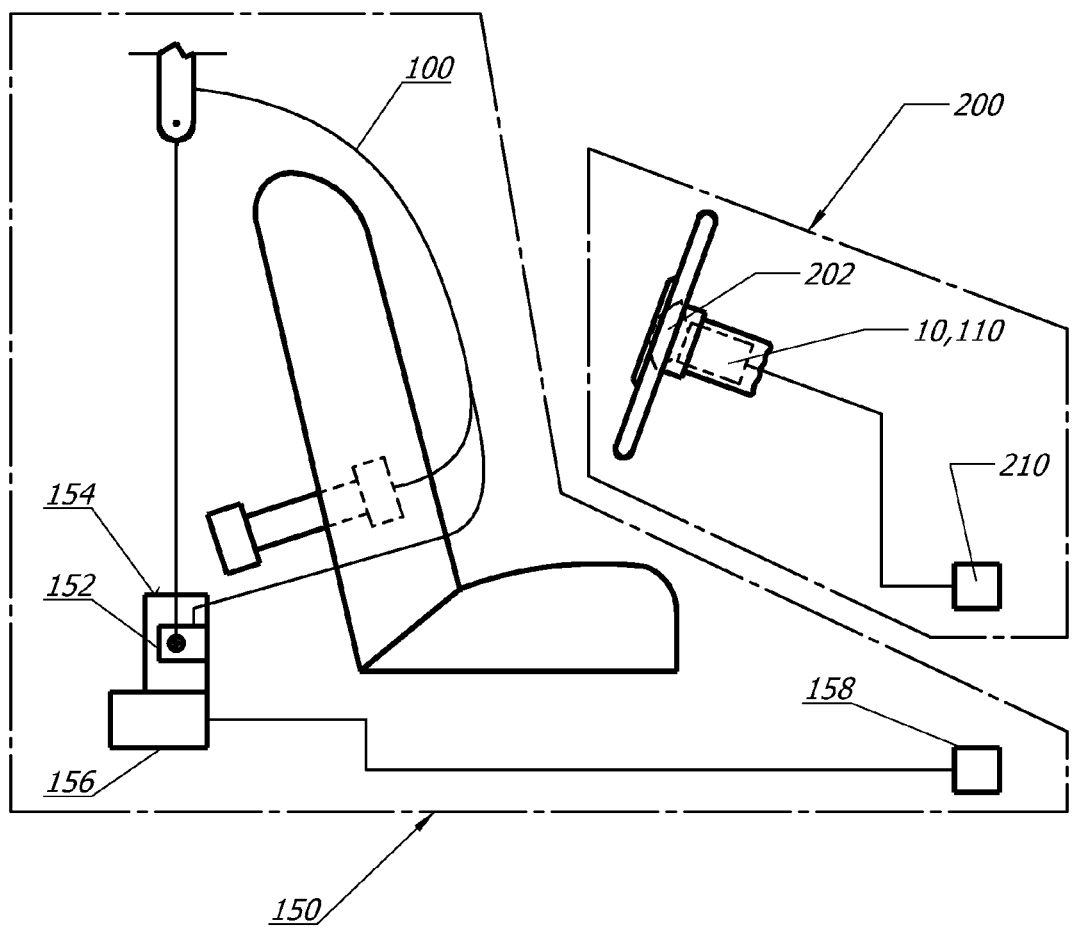
FIG. 7 is a view of a vehicle occupant protection system incorporating a gas generating system in accordance with an embodiment of the present invention.

Referring now to FIG. 7, an embodiment 10, 110 of the gas generating system described above may be incorporated into an airbag system 200. Airbag system 200 includes at least one airbag 202 and a gas generating system 10, 110 in accordance with embodiments of the present invention, coupled to airbag 202 so as to enable fluid communication with an interior of the airbag upon activation of the gas generating system. Airbag system 200 may also include (or be in communication with) a crash event sensor 210. Crash event sensor 210 includes a known crash sensor algorithm that prompts actuation of airbag system 200 via, for example, activation of gas generating system 10 in the event of a collision.

Referring again to FIG. 7, airbag system 200 may also be incorporated into a broader, more comprehensive vehicle occupant protection system 180 including additional elements such as a safety belt assembly 150. FIG. 2 shows a schematic diagram of one exemplary embodiment of such a protection system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a known safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that prompts actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising:
   housing structured to form a booster tube mounting structure therein; and
   a booster tube engaged with the mounting structure so as to form a gas-tight seal therebetween and so as to be movable with respect to the mounting structure,
   and such that the seal is maintained during movement of the tube with respect to the mounting structure, while the tube is engaged with the mounting structure.

2. The system of claim 1 wherein the housing is an outermost housing of the gas generating system, wherein the housing has a base portion and a wall extending from a peripheral edge of the base portion, and wherein the mounting structure is formed into the base portion.

3. The system of claim 1 wherein the mounting structure is structured so as to extend into an open end of the booster tube so as to form a gas-tight seal between the mounting structure and the booster tube.

4. The system of claim 1 wherein the mounting structure is in direct contact with an auto-ignition material positioned within the booster tube when the booster tube is engaged with the mounting structure.

5. An airbag system including a gas generating system in accordance with claim 1.

6. A vehicle occupant protection system including a gas generating system in accordance with claim 1.

7. A gas generating system comprising:
   a housing structured to permit expansion thereof responsive to elevated pressures within the housing;
   a booster tube mounting structure formed by a portion of the housing; and
   a booster tube having a first end structured and engaged with the mounting structure so as to form and maintain a gas-tight seal between the tube and the mounting structure during expansion of the housing, and a second end structured and engaged with another portion of the gas generating system so as to form and maintain a gas-tight seal between the tube and the other portion of the gas generating system during expansion of the housing.

8. The system of claim 7 wherein the mounting structure is in direct contact with an auto-ignition material positioned within the booster tube when the booster tube is engaged with the mounting structure.

9. An airbag system including a gas generating system in accordance with claim 7.

10. A vehicle occupant protection system including a gas generating system in accordance with claim 7.

11. A gas generating system comprising:
    a housing structured to permit expansion thereof responsive to elevated pressures within the housing;
    a booster tube mounting structure formed by a portion of the housing; and
    a booster tube having a first end, a second end opposite the first end, a wall extending between the first and second ends, and at least one gas discharge aperture formed in the wall to enable fluid communication between an interior of the tube and an exterior of the tube,
    each of the first and second ends being structured and engaged with an associated one of the mounting structure and another portion of the gas generating system so as to form a gas-tight seal therebetween prior to expansion of the housing, at least one of the first and second ends being structured and engaged with the associated one of the mounting structure and other portion of the gas generating system so as to maintain a gas-tight seal between the tube and the mounting structure during expansion of the housing.

12. The system of claim 11 further comprising a plurality of gas discharge apertures formed in the tube wall to enable fluid communication between an interior of the tube and an exterior of the tube 1.

13. The system of claim 11 wherein the other one of the first and second ends is structured and engaged with an associated one of the mounting structure and another portion of the gas generating system so as to permit a degree of spacing between the other one of the first and second ends and the associated one of the mounting structure and other portion of the gas generating system during expansion of the housing.

14. The system of claim 11 wherein the mounting structure is in direct contact with an auto-ignition material positioned within the booster tube when the booster tube is mounted on the mounting structure.

15. An airbag system including a gas generating system in accordance with claim 11.

16. A vehicle occupant protection system including a gas generating system in accordance with claim 11.

* * * * *

UNITED STATES PATENT AND TRADEMARK OFFICE
CERTIFICATE OF CORRECTION

| | |
|---|---|
| PATENT NO. | : 8,820,783 B1 |
| APPLICATION NO. | : 13/736847 |
| DATED | : September 2, 2014 |
| INVENTOR(S) | : Thompson et al. |

Page 1 of 1

It is certified that error appears in the above-identified patent and that said Letters Patent is hereby corrected as shown below:

In the Drawings

Please correct figure 6 to include d' as shown in the figure.

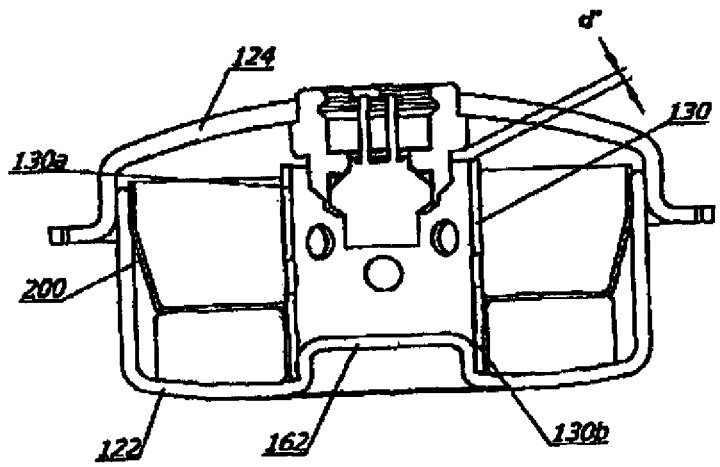

In the Specification

Column 1; Line 47;   Please delete the first occurrence of "is a".

Column 1; Line 62;   Please delete the first occurrence of "is a".

Column 2; Line 57;   Please insert --.-- after structure.

Column 9; Line 3;   Please insert --.-- after element.

Column 10; Line 56;   Please insert --of-- after portion.

Column 12; Line 65;   Please delete "form" and insert --from--.

Signed and Sealed this
Thirty-first Day of March, 2015

Michelle K. Lee
*Director of the United States Patent and Trademark Office*